(12) United States Patent
Tomomatsu

(10) Patent No.: US 8,274,719 B2
(45) Date of Patent: Sep. 25, 2012

(54) PRINTING SYSTEM, PRINT PREVIEW METHOD, AND PREVIEW METHOD USING A PRINTER DRIVER

(75) Inventor: Yoshiaki Tomomatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1220 days.

(21) Appl. No.: 10/301,591

(22) Filed: Nov. 22, 2002

(65) Prior Publication Data

US 2003/0103227 A1 Jun. 5, 2003

(30) Foreign Application Priority Data

Nov. 30, 2001 (JP) ................................ 2001-366554
Nov. 30, 2001 (JP) ................................ 2001-366555

(51) Int. Cl.
*G06F 15/00* (2006.01)
(52) U.S. Cl. ....... 358/527; 358/1.2; 358/1.15; 358/1.16; 715/274; 245/660
(58) Field of Classification Search .................. 358/527, 358/1.2, 1.15, 1.16; 715/274; 345/660
See application file for complete search history.

(56) References Cited

U.S. PATENT DOCUMENTS

| | | | |
|---|---|---|---|
| 6,285,461 B1 * | 9/2001 | Fujii et al. ..................... | 358/1.18 |
| 6,351,317 B1 * | 2/2002 | Sasaki et al. ................. | 358/1.15 |
| 6,526,240 B1 * | 2/2003 | Thomas et al. ................ | 399/72 |
| 6,791,709 B1 | 9/2004 | Nakamura et al. ........... | 358/1.18 |
| 7,064,858 B2 * | 6/2006 | Iwai et al. ...................... | 358/1.2 |
| 7,143,109 B2 * | 11/2006 | Nagral et al. ................ | 707/104.1 |

FOREIGN PATENT DOCUMENTS

| | | |
|---|---|---|
| JP | 05-063955 | 3/1993 |
| JP | 2000-305925 | 11/2000 |
| JP | 2001-063155 | 3/2001 |
| JP | 2001-134560 | 5/2001 |
| JP | 2001-167265 | 6/2001 |
| JP | 2001-209517 | 8/2001 |
| JP | 2001-223887 | 8/2001 |
| JP | 2001-317949 | 11/2001 |

* cited by examiner

*Primary Examiner* — Mark K Zimmerman
*Assistant Examiner* — Mark Milia
(74) *Attorney, Agent, or Firm* — Fitzpatrick, Cella, Harper & Scinto

(57) ABSTRACT

A printing system is capable of displaying a preview of an image with a low resolution without causing degradation in performance and affinity for an operating system. When previewing is performed, preview printer information corresponding to the low resolution is set as printer information in a printer graphics driver by a print processor. The printer graphics driver produces a preview file by converting (rasterizing) an EMF spool file into low-resolution data. The resultant preview file is displayed as a print image on a display by a previewer.

9 Claims, 13 Drawing Sheets

FIG. 7

| | |
|---|---|
| ulVersion | VERSION OF DEVICE DRIVER |
| ... | ... |
| ulHorzSize | PHYSICAL WIDTH OF SCREEN IN UNITS OF MM |
| ulVertSize | PHYSICAL HEIGHT OF SCREEN IN UNITS OF MM |
| ulHorzRes | WIDTH OF PRINT AREA IN UNITS OF PIXELS |
| ulVertRes | HEIGHT OF PRINT AREA IN UNITS OF PIXELS |
| ..... | ..... |
| ulLogPixelsX | THE NUMBER OF PIXELS PER LOGICAL INCH IN THE HORIZONTAL DIRECTION OF THE SCREEN |
| ulLogPixelsY | THE NUMBER OF PIXELS PER LOGICAL INCH IN THE VERTICAL DIRECTION OF THE SCREEN |
| ....... | ....... |
| ptlPhysOffset .x | DISTANCE IN DEVICE UNITS FROM THE PHYSICAL LEFT END OF PAGE TO THE LEFT END OF PRINTABLE AREA |
| ptlPhysOffset .y | DISTANCE IN DEVICE UNITS FROM THE PHYSICAL TOP END OF PAGE TO THE TOP END OF PRINTABLE AREA |
| szlPhysSize .x | PHYSICAL WIDTH OF PAGE IN DEVICE UNITS |
| szlPhysSize .y | PHYSICAL HEIGHT OF PAGE IN DEVICE UNITS |
| ...... | ...... |

FIG. 8

| | | |
|---|---|---|
| dmDeviceName | DEVICE NAME |
| dmSpecVersion | VERSION NUMBER OF INITIALIZATION DATA SPECIFICATIONS |
| dmDriverVersion | VERSION NUMBER OF THE DRIVER |
| dmSize | DATA SIZE OF DEMODE EXCLUDING dmDriverData MEMBERS |
| dmDriverExtra | LENGTH IN BYTES OF PRIVATE DRIVER DATA FOLLOWING THIS DATA |
| dmFields | INDICATES INITIALIZED MEMBER |
| dmOrientation | ORIENTATION OF PAPER |
| dmPaperSize | SIZE OF PAPER FOR USE IN PRINTING |
| dmPaperLength | PAPER LENGTH (IN UNITT OF 0.1 MM) |
| dmPaperWidth | PAPER WIDTH (IN UNITT OF 0.1 MM) |
| . . . | . . . |
| dmPrintQuality | PRINTER RESOLUTION |
| dmColor | SETTING OF THE COLOR PRINTER IN TERMS OF COLOR AND MONOCHROME |
| . . . | . . . |
| dmDriverData | INFORMATION PECULIAR TO THE DEVICE |

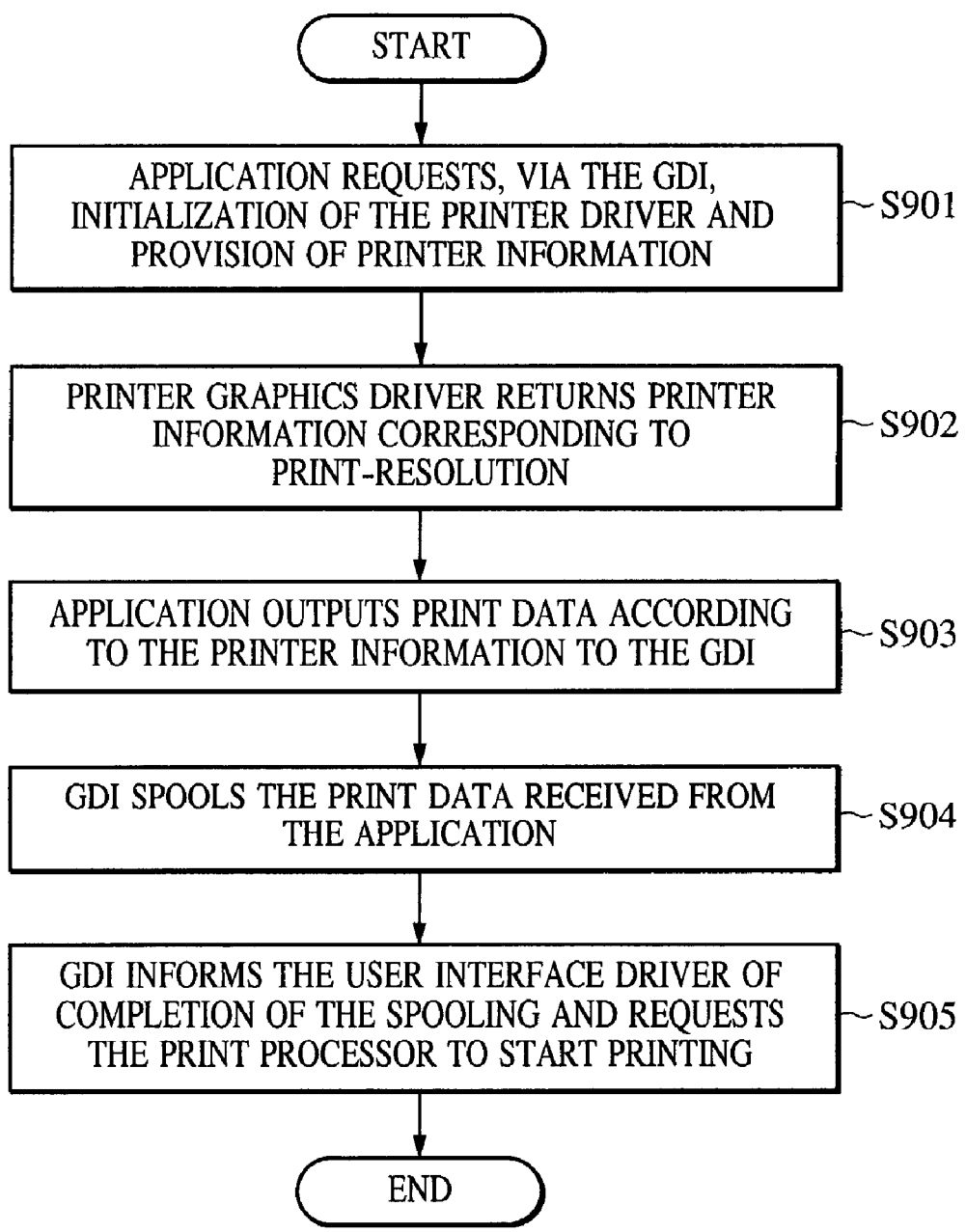

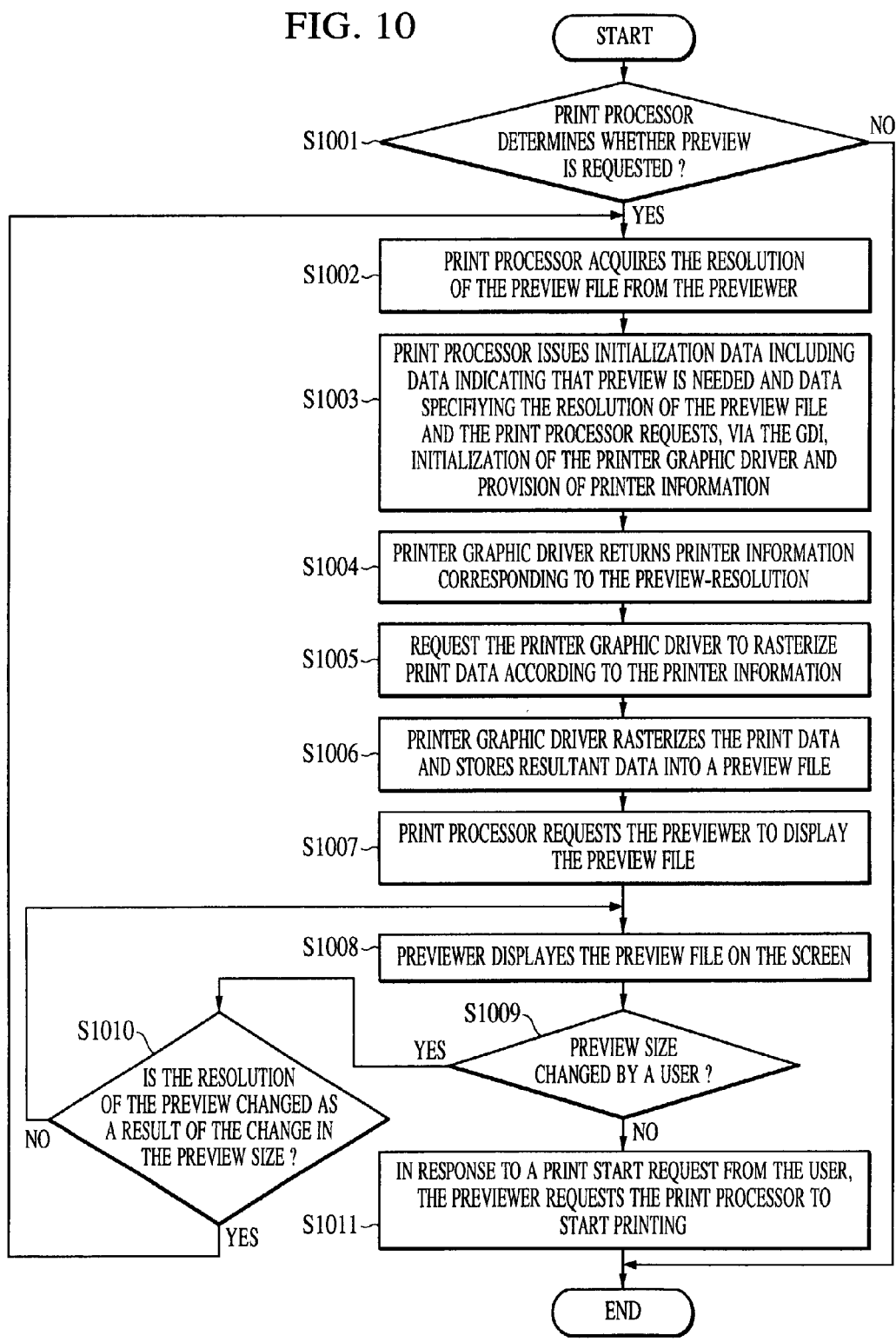

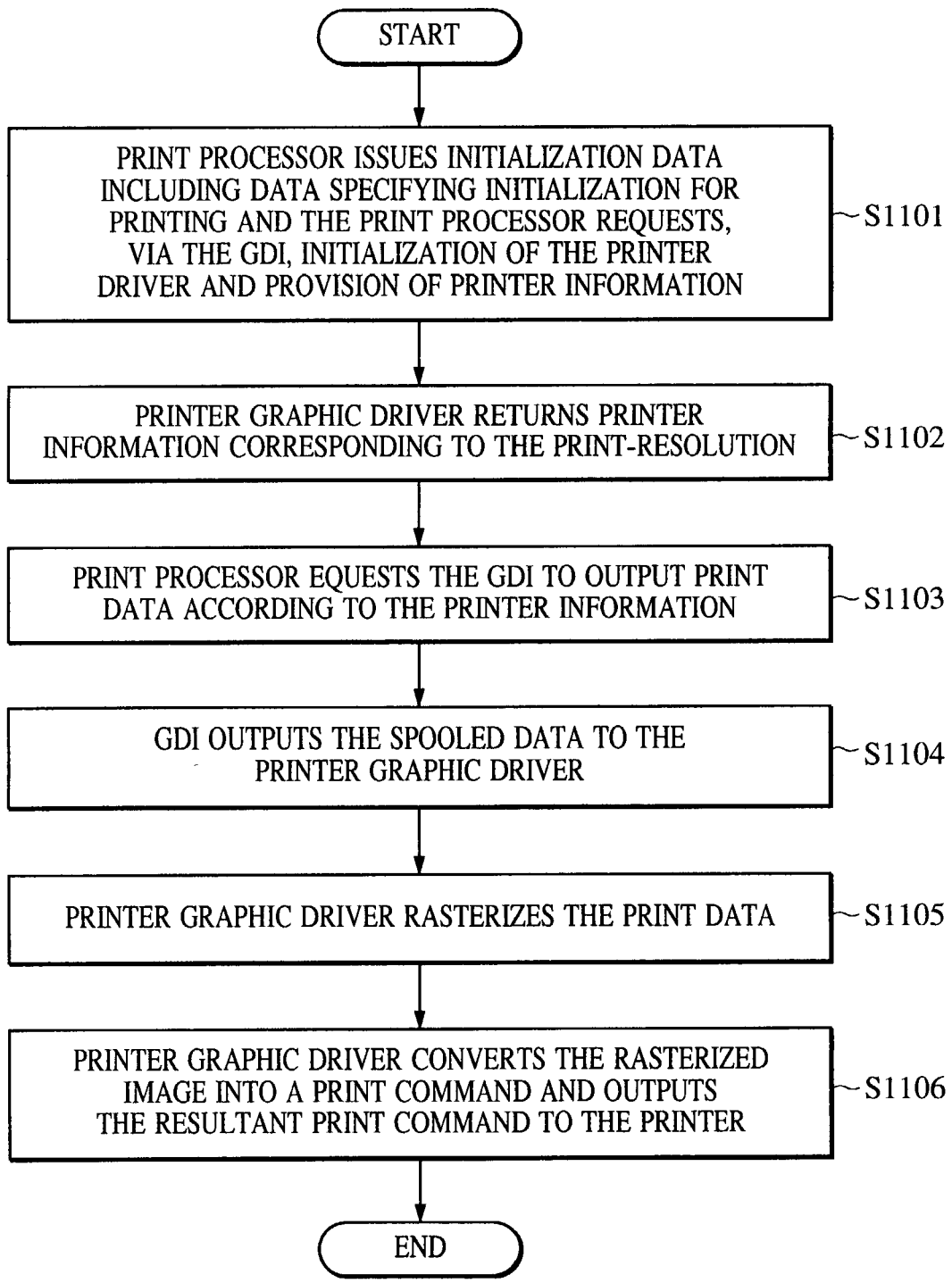

PRINTING SYSTEM, PRINT PREVIEW METHOD, AND PREVIEW METHOD USING A PRINTER DRIVER

BACKGROUND OF THE INVENTION

1. Field of the Invention

The present invention relates to a printing system, a print preview method, a program, a printer driver, and a preview method using a printer driver, having a capability of previewing an image to be printed on paper in accordance with print data produced by application software.

2. Description of the Related Art

It is known to use a print preview function to display, on a screen of a host computer, an image of data which may include characters and graphical image to be printed, before the data is actually printed on paper, so that a user can know how the data will be printed. This print preview function allows the user to check the image to be printed and to perform a re-edit until a satisfactory layout has been achieved.

Many applications have a print preview function. On the other hand, the performance and functions of printer drivers have been improved, and a recent printer driver has a capability of modifying a layout. Thus, there has arisen a need for a printer driver capable of previewing data after the layout is modified. In a case in which previewing is performed using a printer driver, print data which may include characters and graphical data converted (rasterized) into a bitmap form and displayed on a screen before the bitmap data is transmitted to a printer.

In the case of a printer having a high resolution, print data is converted into high-resolution bitmap data. Therefore, if the resultant high-resolution bitmap data is displayed, a preview process takes a long time. In some cases, preview bitmap data is saved in a file so that it can be used when the preview image is displayed again. However, such a file becomes very large in size. To avoid the above problem, it is required to produce bitmap data with a low resolution for use of preview. However, when the spooling function provided in a system is used, it is impossible to change the resolution after spooling is performed. Therefore, to change the resolution after spooling is performed, it is necessary to develop a special spooling function capable of changing the resolution and add it to the spooling function of the system. However, this method needs an additional cost for the development of the special spooling function. Besides, in this method, the two-stage spooling causes degradation in performance and affinity for an OS (Operating System).

In a case in which a high-resolution printer is used, data is converted into bitmap data with a high resolution. If such high-resolution bitmap data is used in previewing of a print image, preview processing will take a long time. When previewing is performed using low-resolution bitmap data to avoid the above problem, if the image displayed according to the low-resolution bitmap data is enlarged, jaggies become conspicuous.

Jaggies can be reduced if the resolution of the preview bitmap data is changed depending on the size of the preview image displayed on the screen. However, in this method, it is necessary to produce bitmap data each time the scaling factor is changed, and thus additional processing time is needed.

In a case in which rasterizing is performed into a resolution different from the resolution of spooled data, it is necessary to perform a coordinate transformation. In this case, depending on the difference between the resolution of spooled data and the rasterization resolution, the width of lines which should be displayed with the same width, can differ depending on the location of lines.

For example, as shown in FIG. 13, if an image including lines with the same width and numeric characters with the same width is rasterized into a resolution different from the spooled resolution, the line width in the resultant preview image can be different depending on the locations of lines and numeric characters can have large jaggies.

SUMMARY OF THE INVENTION

It is an object of the present invention to provide a printing system, a print preview method, and a program, capable of performing previewing without causing degradation in performance and affinity for an operating system.

It is another object of the present invention to provide a printer driver and a method of previewing using a printer driver, capable of previewing using a spool function of an operating system.

It is still another object of the present invention to provide a printing system, a print preview method, and a program, capable of minimizing jaggies and location-dependent variations in line width in a preview image which can occur when a preview size is changed, and also capable of minimizing the frequency of again producing the preview image in response to changing the preview image size.

It is still another object of the present invention to provide a printer driver and a method of previewing using a printer driver, capable of previewing an image with minimized jaggies and minimized variations in line width.

According to an aspect of the present invention, to achieve the above objects, there is provided a printing system comprising spooling means for spooling print data produced by application software, print control means for converting spooled print data into data according to printer information, display means for displaying a preview image corresponding to an image to be printed on paper, and setting means for setting a preview resolution as printer information, wherein if the preview resolution is set in the print control means by the setting means, the print control means converts the spooled print data into data corresponding to the preview resolution and outputs the resultant data as data of the preview image to the display means.

According to another aspect of the present invention, there is provided a printer driver using a function of spooling data produced by an application in accordance with a print resolution, the printer driver comprising means for, when previewing is performed in accordance with spooled data, requesting outputting data according to a preview resolution and making previewing performed in accordance with data output after being converted in coordinates, and means for, when printing is performed in accordance with spooled data, requesting outputting data according to the print resolution, producing a printer command on the basis of the output data, and outputting the resultant printer command to a printer.

Further objects, features and advantages of the present invention will become apparent from the following description of the preferred embodiments with refer to the attached drawings.

BRIEF DESCRIPTION OF THE DRAWINGS

FIG. 7 is a diagram showing part of the data structure of GDIINF.

FIG. 8 is a diagram showing part of the data structure of DEVMODE.

FIG. 9 is a flow chart showing a procedure of spooling performed in response to a print request issued by an application.

FIG. 10 is a flow chart showing a procedure of previewing spooled data.

FIG. 11 is a flow chart showing a procedure of printing spooled data.

DECRIPTION OF THE PREFERRED EMBODIMENTS

The present invention is described in further detail below with reference to embodiments in conjunction with the accompanying drawings.

Figure 1:
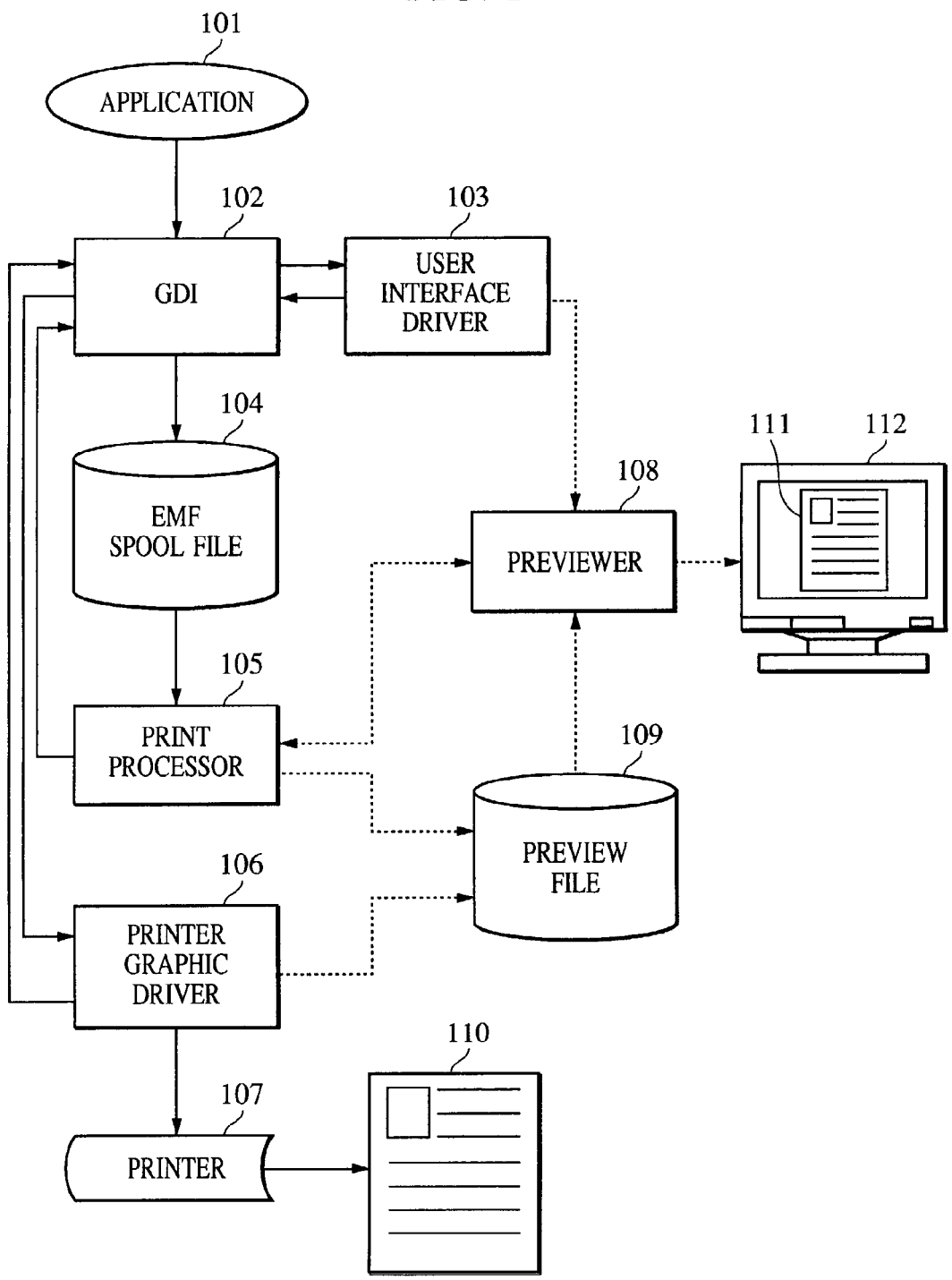
FIG. 1 is a block diagram showing a construction of a printing system according to an embodiment of the present invention.

FIG. 1 is a block diagram illustrating a printing system according to an embodiment of the present invention.

In the printing system according to the present embodiment, by way of example, the system includes a personal computer connected to a monitor and a printer, wherein Microsoft Windows (registered trademark) which is a widely used operating system (OS) is employed as an OS of the personal computer, and an application program (hereinafter, referred to simply as an application) having a capability of printing, is installed on the personal computer.

In this printing system, as shown in FIG. 1, an application 101 transmits data, to be printed, to a graphics device interface (hereinafter, referred to as the GDI) 102. If the GDI 102 receives the data from the application 101, the GDI 102 generally spools it as an EMF (Enhanced Meta File) data in an EMF spool file 104. If the spooling is completed, the GDI 102 transmits information indicating the completion of printing to a user interface driver (a UI (user interface) function of a printer driver) 103 and, at the same time, requests a print processor 105 to perform printing.

If the user interface driver 103 receives the information indicating the completion of printing, the user interface drive 103 activates a previewer 108 which is an application for previewing.

On the other hand, the print processor 105 transmits the EMF spool file 104 to a printer graphics driver (a graphical function of the printer driver) 106 via the GDI 102. The printer graphics driver 106 produces low-resolution bitmap data to be used as preview bitmap data from the EMF spool file 104 and the printer graphics driver 106 stores the resultant preview bitmap data in a preview file 109.

If the print processor 105 receives, from the printer graphics driver 106, information indicating that the low-resolution bitmap data has been produced, the print processor 105 requests the previewer 108 to start the preview process. The previewer 108 reads the preview file 109 and displays it as a print image 111 on a display 112.

Thereafter, if the print processor 105 receives, via the previewer 108, a print command issued by a user, the print processor 105 commands, via the GDI 101, the printer graphics driver 106 to print the EMF spool file 104. The printer graphics driver 106 converts the EMF spool file 104 to a command in a form which can be interpreted by a printer 107 and the printer graphics driver 106 outputs it to the printer 107. The printer 107 prints an image on a paper 110 in accordance with the received command.

The application 101 is provided by an application program such as a word processor, and the function of spooling into the EMF spool file 104 by the GDI 102 is provided by the operating system. The user interface driver 103, the print processor 105, the printer graphics driver 106, and the previewer 108 are provided by a printer driver supplied by a printer manufacturer.

Figure 2:
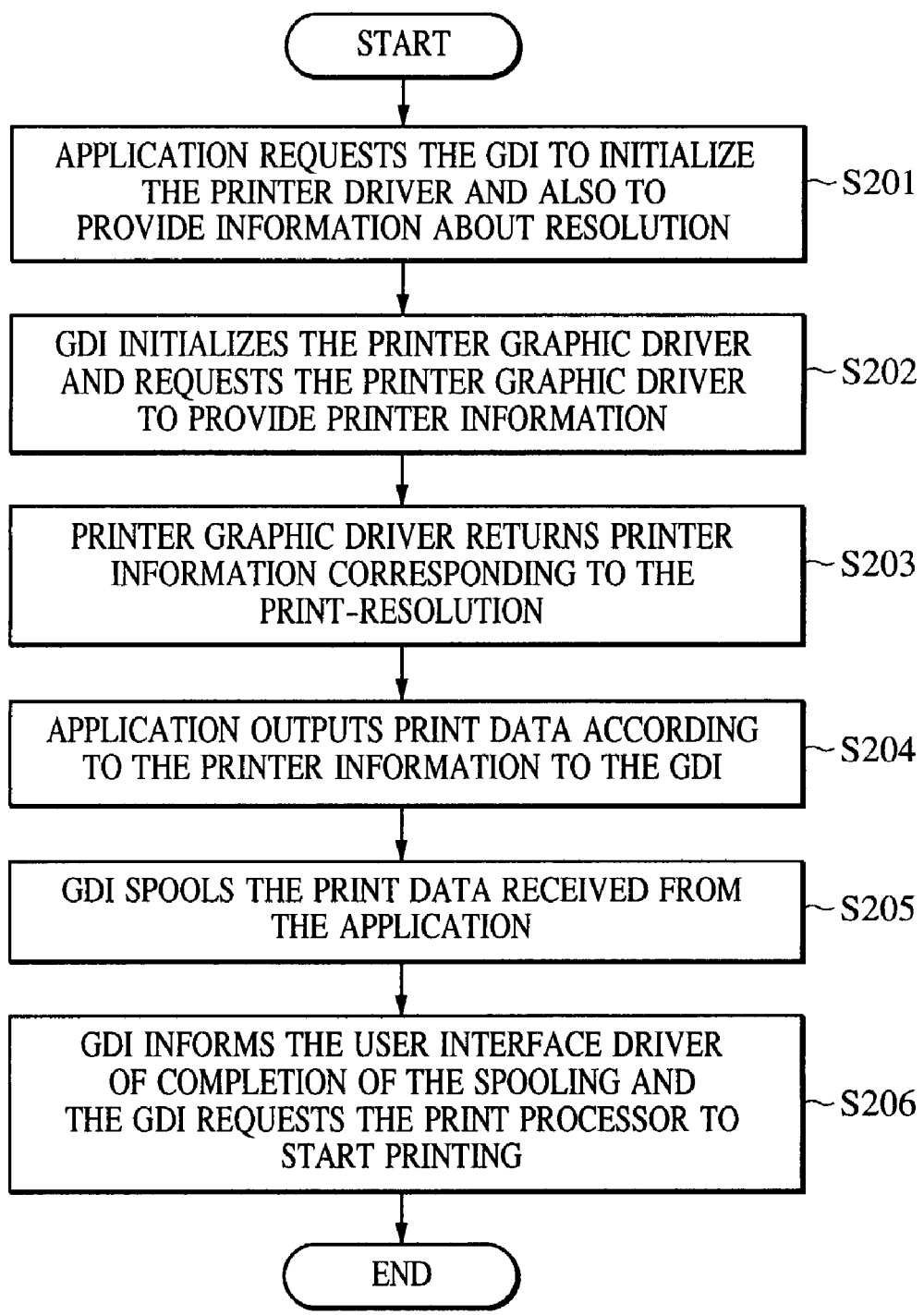
FIG. 2 is a flow chart showing a spooling procedure performed by an application.
Figure 3:
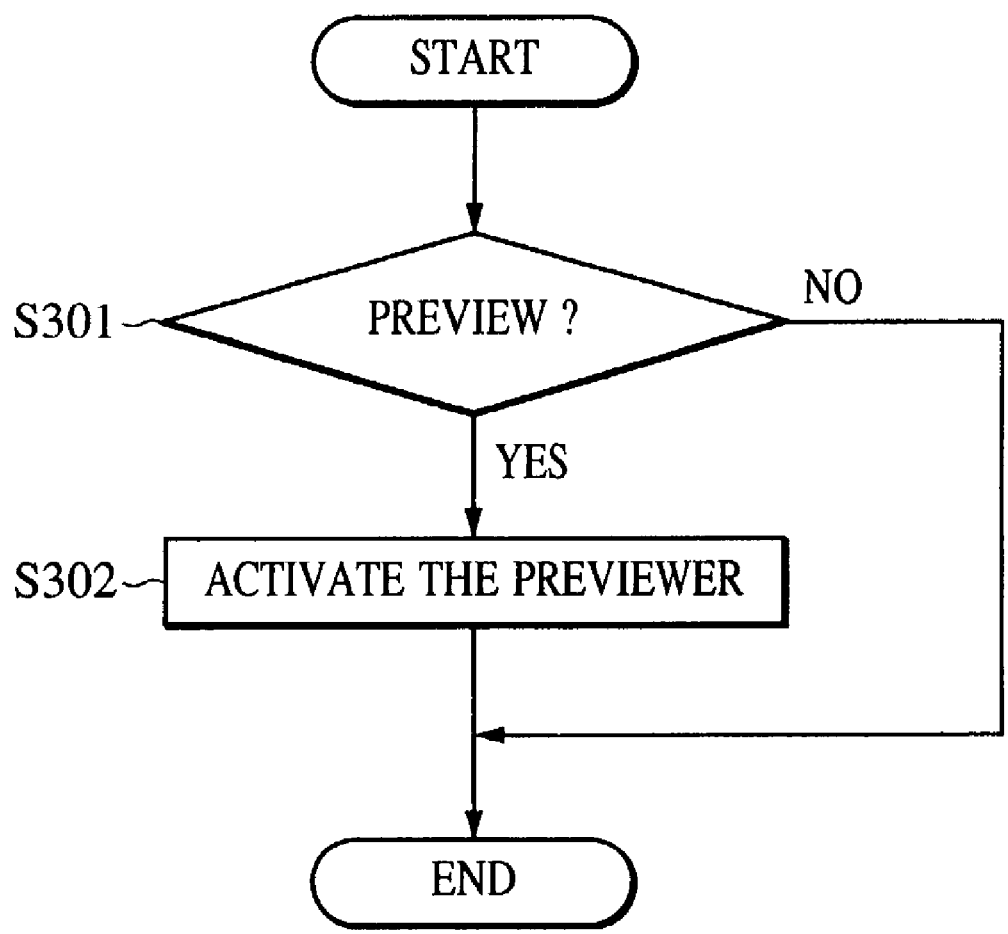
FIG. 3 is a flow chart showing a procedure performed by a user interface driver to activate a previewer.
Figure 4:
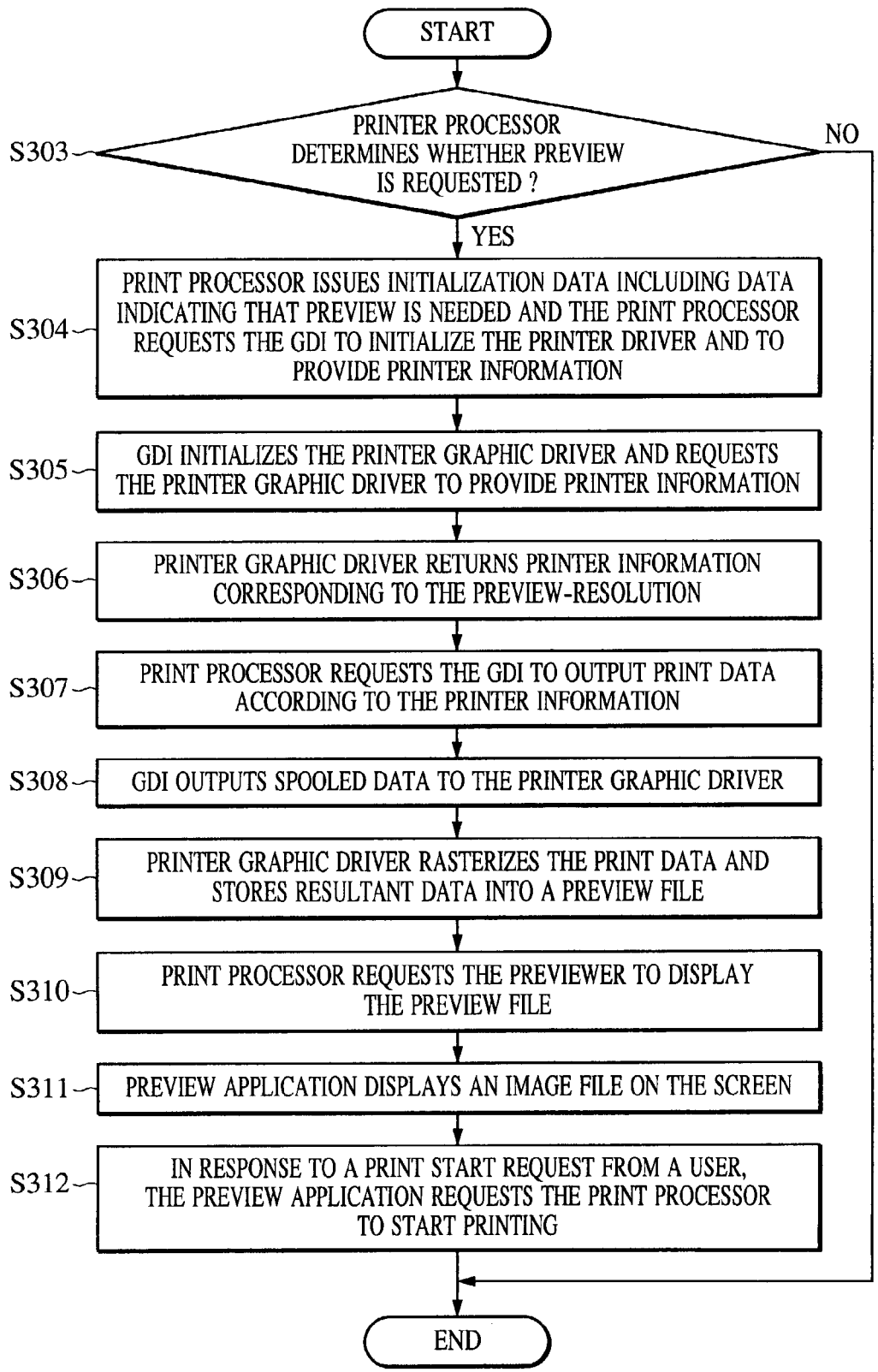
FIG. 4 is a flow chart showing a procedure of previewing spooled data.
Figure 5:
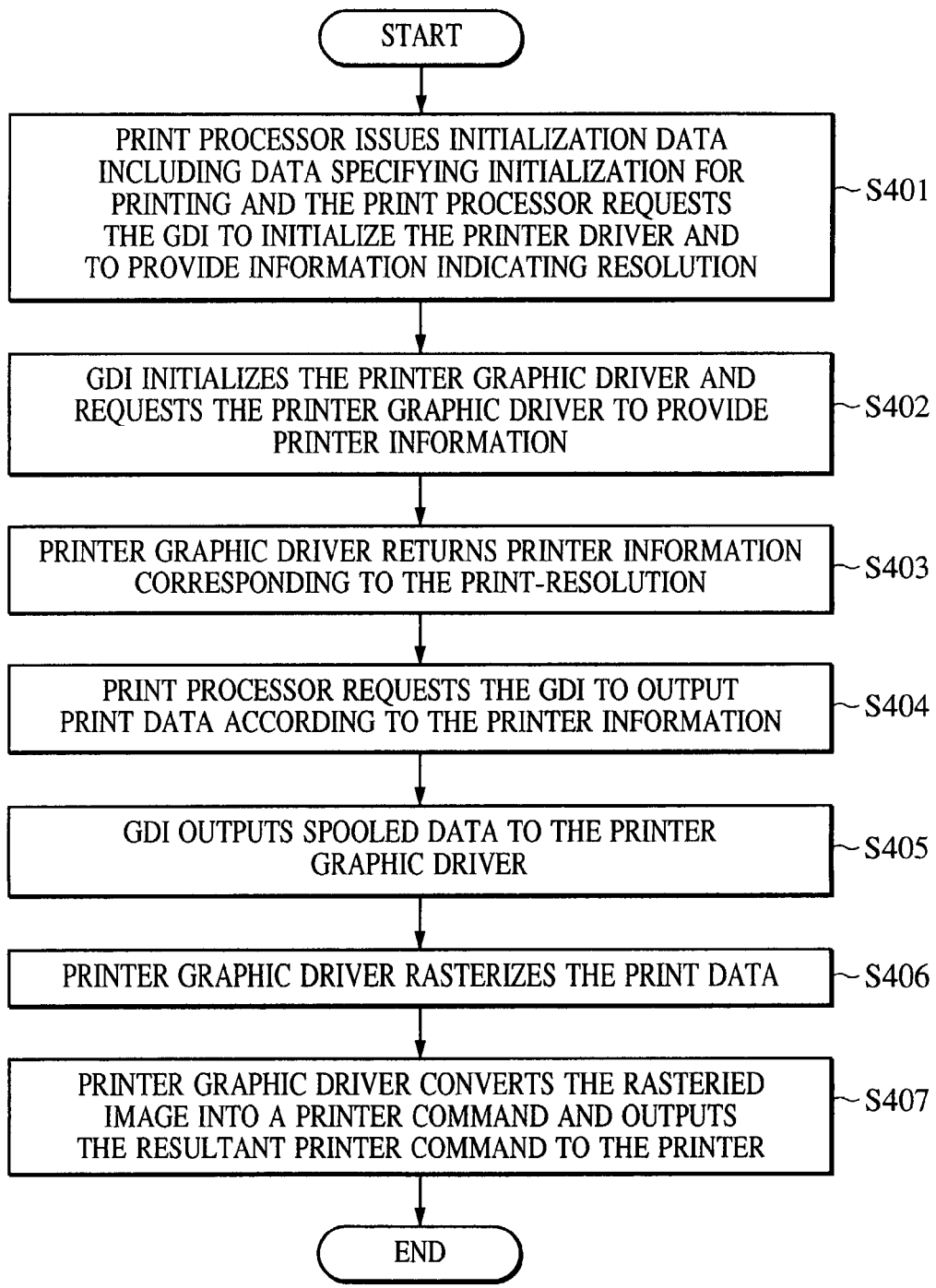
FIG. 5 is a flow chart showing a procedure of printing spooled data.
Figure 6:
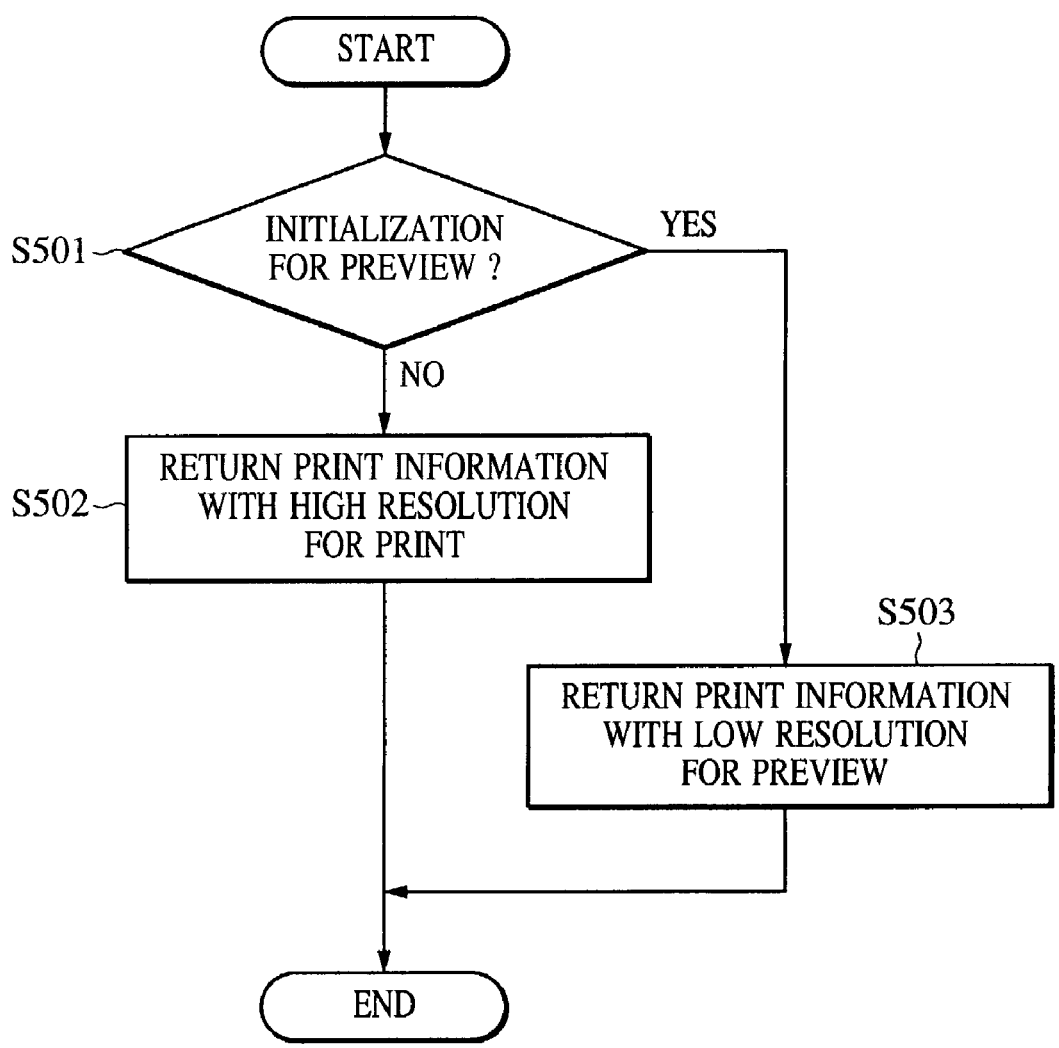
FIG. 6 is a flow chart showing a procedure performed by a printer driver to determine which printer information is to be set.

The process performed in the present embodiment is described below with reference to FIGS. 2 to 8. FIG. 2 is a flow chart showing a spooling procedure performed by the application 101. FIG. 3 is a flow chart showing a procedure performed by the user interface driver 103 to activate the previewer. FIG. 4 is a flow chart showing a procedure of previewing spooled data. FIG. 5 is a flow chart showing a procedure of printing spooled data. FIG. 6 is a flow chart showing a procedure performed by the printer driver to perform setting associated with printer information. FIG. 7 shows part of the data structure of GDIINF. FIG. 8 shows part of the data structure of DEVMODE.

First, the process of spooling print data produced by the application 101 is described.

In order to print data, the application 101 has to produce data in accordance with the resolution of the printer to be used and the printing area (the number of pixels depending on the resolution). To meet the above requirement, when data produced by the application 101 is printed, as shown in FIG. 2, the application 101 requests the GDI 102 to initialize the printer driver and to provide printer information indicating the printing area and the resolution of the printer 107 (step S201).

In response to receiving the request for initialization of the printer driver from the application 101, the GDI 102 initializes the printer graphics driver 106 and then requests the printer graphics driver 106 to supply printer information called GDIINFO (step S202). In response to receiving the request, the printer graphics drive 106 returns printer information to the application 101 (step S203). The printer information returned from the printer graphics driver 106 to the application 101 is described, as shown in FIG. 7, in the form of GDIINFO in which the paper size, the printing area on paper, and other parameters are specified. More specifically, in the printer information, for example, the rasterization resolution is specified by ulLogPixelsX and ulLogPixelsY, and ulHorzRes/ulVertRes (printing area on paper), ptlPhysOffset.x/ptlPhysOffset.y (paper size), and other parameters are set depending on the rasterization resolution.

The printer graphics driver 106 determines, as shown in FIG. 6, whether the requested initialization is for previewing, on the basis of a judgment on whether a preview flag is set (step S501). In this specific case, the preview flag is not set in the initialization request issued by the application 101, and thus the printer graphics driver 106 returns, to the GDI 102, printer information corresponding to the high resolution for printing (step S502).

If the GDI 102 receives the printer information, the GDI 102 transfers it to the application 101. The application 101 produces print data in accordance with the resolution, the printing area, and other parameters described in the received printer information. The resultant print data is transmitted to the GDI 102 (step S204).

The GDI 102 spools the data, requested by the application 101 to be printed, into an EMF spool file 104 according to a standard spool file format of Windows (registered trademark) using a spooler (step S205). After completion of the spooling, the GDI 102 informs the user interface driver 103 of the completion of the spooling and requests the print processor 105 to start printing. Thus, the present processing is completed.

A process of previewing spooled data is described below. This process is performed when previewing is specified to be performed by the application.

First, the operation of the user interface driver 103 is described. The user interface driver 103 is one of functions of the printer driver and serves to present a setting screen to a user so that the user can perform setting associated with the printer driver. The user interface driver 103 is also capable of, in response to receiving, in step S206, information indicating the completion of spooling from the GDI 102, prompting a user to again set the information before printing is started. This function is used in the present embodiment such that when previewing is performed, the user interface driver 103 activates the previewer 108 which is an application serving to perform previewing.

More specifically, as shown in FIG. 3, if the user interface driver 103 receives, from the GDI 102, the information indicating that the spooling has been completed (step S206), the user interface driver 103 determines whether the print data specified by the GDI 101 is for previewing (step S301). In this step, the judgment on whether the print data is for use in previewing is made on the basis of data called DEVMODE in which the UI associated with the print data is described. FIG. 7 shows an example of the data structure of DEVMODE. When the application 101 prompts a user to perform setting associated with the printer driver of a user, the application 101 transmits DEVMODE having such a data structure to the printer driver and requests the printer driver to display the setting screen. When the setting performed by the user is completed, the printer driver describes the data indicating the setting in DEVMODE and returns it to the application 101. When printing is performed, the application 101 transmits print data together with DEVMODE and requests printing.

In the data structure of DEVMODE, parameters other than dmDriverData indicate specifications which are common with the OS. dmDriverData includes information indicating whether previewing is necessary and dmDriverData is allowed to be used freely by each driver.

In a case in which it is determined in step S301 that previewing is necessary, the user interface driver 103 activates the previewer 108 (step S302). However, if it is determined that previewing is not necessary, the user interface driver 103 terminates the process.

Now, the operation of the print processor 105 is described.

If the print processor 105 receives the print request in step S206, the print processor 105 makes a judgment, as shown in FIG. 4, in a similar manner as the user interface driver 103 makes the judgment in step S301. That is, the print processor 105 determines whether the print data specified by the GDI 102 is for previewing (step S303). If it is determined herein that previewing is not necessary, the present process is ended and the next print process is started.

On the other hand, in a case in which it is determined in step S303 that previewing is necessary, the print graphics driver 106 is initialized before starting producing a preview file 109, that is, a preview image file. More specifically, in this case, in order to notify the printer graphics driver 106 that the print graphics driver 106 is to be initialized for previewing, the print processor 105 sets a flag in DEVMODE so as to indicate that the initialization is for previewing and requests the GDI 102 to initialize the print graphics driver 106 and to supply printer information including data indicating the printing area and the resolution of the printer 107 (step S304).

If the GDI 102 receives the request for initialization of the printer driver from the print processor 105, the GDI initializes the printer graphics driver 106 and requests the printer graphics driver 106 to return printer information GDIINFO (step S305). In response to the request, the printer graphics driver 106 initializes GDIINFO and returns FDIINFO to the print processor 105 (step S306). In this initialization step, as shown in FIG. 6, the printer graphics driver 106 determines whether the initialization is for previewing by judging whether the preview flag is set (step S501). In this specific case, because the preview flag has been set by the print processor 105, the printer graphics driver 106 sets GDIINFO so as to include printer information corresponding to the low resolution for use in previewing, and the printer graphics driver 106 returns GDIINFO to the GDI 102 (step S503).

If the print processor 105 receives the printer information via the GDI 102, the print processor 105 requests the GDI 102 to perform a coordinate transformation on the EMF spool file 104 in accordance with the printing area described in the printer information, and then requests the GDI 102 to perform printing (S307). Thus, even if the printer graphics driver 106 is in a mode in which the resolution becomes different from the resolution of spooled data, the printing is performed into the same layout regardless of the difference in resolution because, in response to the request from the print processor 105, the GDI 102 performs the coordinate transformation on the EMF spool file 104 and outputs the resultant data to the printer graphics driver 106.

Thereafter, the GDI 102 outputs the EMF spool file 104 page by page to the printer graphics driver (step S308). The printer graphics driver 106 rasterizes the received data into a bitmap form and stores the resultant bitmap data as a preview file 109 in the form of an image file (step S309). When the process is completed for one page, the process is stopped temporarily so that the print processor 105 can perform the following process.

The preview file 109 may be in any form. For example, the preview file 109 may be in the form of multilevel data before being halftoned or in the form of two-level data after being halftoned.

After completion of producing the preview file 109, the print processor 105 informs the previewer 108 of the completion of producing the preview file 109 and the print processor 105 requests the previewer 108 to display the preview file 109 (step S310). In response to receiving the request, the previewer 108 displays the preview file 109, produced in step S309, as a print image 111 on the display 112 (step S311).

Thereafter, in response to a print start request issued by the user, the previewer 108 requests the print processor 105 to start printing (step S312).

In the above-described process of previewing the spooled data, the previewer 108 is activated by the user interface driver 103. Alternatively, the previewer 108 may be activated by the printer graphics driver 106 or the print processor 105.

The process of printing the spooled data is described below. This process is performed when a print command is issued by the application or when a print command is issued in the preview process.

To print the spooled data, as shown in FIG. 5, the print processor 105 first produces initialization data specifying that initialization for printing is to be performed, and the print processor 105 requests the GDI 102 to initialize the print graphics driver 106 and to supply printer information including data indicating the printing area and the resolution (step S401). Herein, it is required to inform the GDI 102 that the initialization of the printer graphics driver 106 is not for previewing, and thus the preview initialization flag in DEV-MODE, which was set in step S304, is cleared.

If the GDI 102 receives the request from the print processor 105 for initialization of the printer graphics driver 106, the GDI 102 initializes the printer graphics driver 106 and requests the printer graphics driver 106 to return GDIINFO (step S402). In response to receiving the request, the printer graphics driver 106 returns corresponding printer information to the print processor 105 via the GDI 102 (step S403). In the above step, it is determined whether previewing should be performed by judging whether the preview flag is set. In this specific case, because the preview flag has not been set by the print processor 105, the printer graphics driver 106 calculates the printer information corresponding to the high resolution for printing and describes the result in GDIINFOR. DIINFO including the printer information is returned to the GDI 102.

If the print processor 105 receives the printer information via the GDI 102, the print processor 105 requests the GDI 102 to perform a coordinate transformation on the EMF spool file 104 in accordance with the printing area described in the printer information, and then requests the GDI 102 to perform printing (step S404). In response, the GDI 102 outputs the EMF spool file 104 to the printer graphics driver 106 (step S405).

The printer graphics driver 106 rasterizes the EMF spool file 104 into the form of bitmap data (step S406). The printer graphics driver 106 then converts the rasterized bitmap data into a printer command and outputs it to the printer 107 (step S407). Thus, the present process is completed.

By performing the process as described above, data spooled into a high resolution using the spooling function of the system can be rasterized into a low resolution for use of previewing and the resultant rasterized image with the low resolution can be displayed as a preview image of a print image 111.

In the above-described process according to the present embodiment, the user interface driver 103 activates the previewer 108, and the print processor 105 requests the previewer 108 to start previewing. Alternatively, the print processor 105 may activate the previewer 108, or the printer graphics driver 106 may activate the previewer 108 and request the previewer 108 to start previewing.

The above-described functions (including functions described above with reference to the flow charts shown in FIGS. 2 to 6) of the present embodiment may also be achieved by supplying a storage medium, on which a software program implementing the functions is stored, to a system or an apparatus whereby a computer (CPU or MPU) in the system or apparatus reads and executes the program code stored on the storage medium.

In this case, it should be understood that the program code read from the storage medium implements the functions of invention and thus the storage medium storing the program code falls within the scope of present invention.

Specific examples of storage media which can be preferably employed in the present invention to supply the program code include a floppy disk (registered trademark), a hard disk, an optical disk, a magneto-optical disk, a CD-ROM, a CD-R, a magnetic tape, a nonvolatile memory card, and a ROM.

Furthermore, the scope of the present invention includes not only such a system in which the functions of the embodiment described above are implemented simply by reading and executing a program code on a computer but also a system in which a part of or the whole of the process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of the process instructed by the program code is performed by a CPU or the like in the function extension board or the function extension unit thereby implementing the functions of any embodiment described above.

In the present embodiment, as described above, if a preview resolution is set as printer information in the print control means, spooled print data is converted by the print control means into data with the preview resolution and the resultant data displayed as a preview image on the display means, thereby making it possible to display the preview image with the low resolution without causing degradation in performance and a reduction in affinity for the operating system.

Furthermore, the present embodiment can provide a printer driver capable of performing previewing using the spooling function of the operating system.

Figure 12:
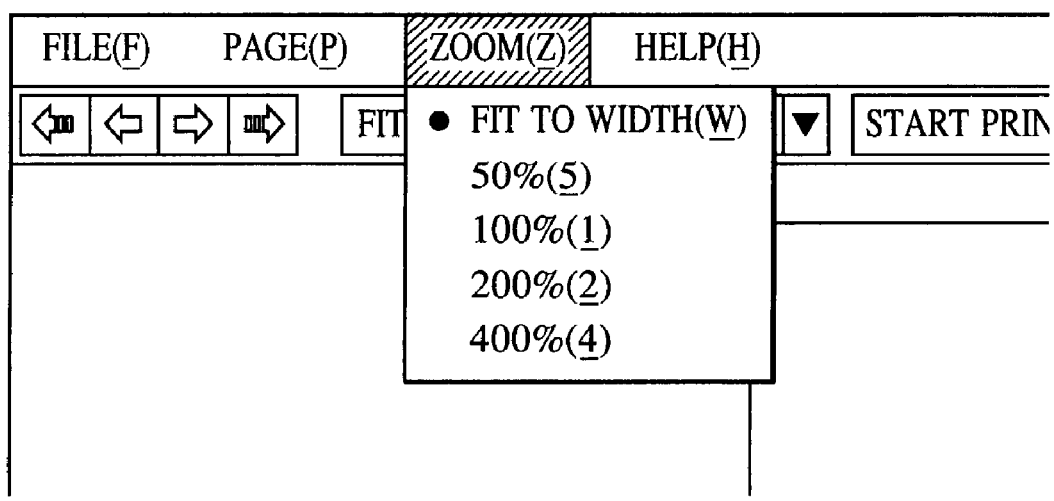
FIG. 12 is a diagram showing a manner of changing the scaling factor on a printing image screen.

Now, processes according to other embodiments are described below with reference to FIGS. 1, 3, and 6 to 13. These processes are performed in a similar system to that shown in FIG. 1. FIG. 9 is a flow chart showing a spooling procedure performed in response to a print request issued by an application. FIG. 3 is a flow chart showing a procedure performed by the user interface driver to activate the previewer. FIG. 10 is a flow chart showing a procedure of previewing spooled data. FIG. 11 is a flow chart showing a procedure of printing spooled data. FIG. 6 is a flow chart showing a procedure performed by the printer driver to perform setting associated with printer information. FIG. 7 shows part of the data structure of GDIINF. FIG. 8 shows part of the data structure of DEVMODE. FIG. 12 is a diagram showing a manner of changing the scaling factor on a printing image screen.

First, the process of spooling data in response to a print request issued by the application 101 is described. In order to print data, the application 101 has to produce data in accordance with the resolution of the printer to be used and the printing area (the number of pixels depending on the resolution). Thus, to print data produced by the application 101, as shown in FIG. 9, the application 101 requests the GDI 102 to initialize the printer driver and to provide printer information indicating the printing area and the resolution of the printer 107 (step S901).

In response to the request, the printer graphics driver 106 performs initialization and sets printer information called GDIINFO. The resultant printer information GDIINFO is returned to the GDI 102, which in turn returns printer information based on the GDIINFO to the application 101 (step S902). The printer information returned from the printer graphics driver 106 to the application 101 is described, as shown in FIG. 7, in the form of GDIINFO in which data specifying the paper size and the printing area on the paper is described. More specifically, in the printer information, for example, the rasterization resolution is specified by ulLogPixelsX and ulLogPixelsY, and ulHorzRes/ulVertRes (printing area on paper), ptlPhysOffset.x/ptlPhysOffset.y (paper size), and other parameters are set depending on the rasterization resolution.

When the printer graphics driver 106 performs the initialization in response to the request, as shown in FIG. 6, the printer graphics driver 106 checks whether the preview flag is set to determine whether the initialization is for previewing (step S501). In this specific case, the preview flag is not set because the request for the initialization has been issued by the application 101. Thus, the printer graphics driver 106 calculates printer information corresponding to the high resolution for printing and describes the result in GDIINFO. The resultant printer information is returned to the GDI 102 (step S502).

If the GDI 102 receives the printer information, the GDI 102 transfers it to the application 101. The application 101 produces print data in accordance with the resolution, the printing area, and other parameters described in the received printer information. The produced print data is output to the GDI 102 (step S903).

The GDI 102 spools the data, requested by the application 101 to be printed, into an EMF spool file 104 according to a standard spool file format of Windows (registered trademark) using a spooler (step S904). If the spooling is completed, the GDI 102 informs the user interface driver 103 of the completion of the spooling and requests the print processor 105 to start printing (step S905).

A process of previewing spooled data is described below. This process is performed if previewing is specified to be performed when printing is performed by the application.

First, the operation of the user interface driver 103 is described. The user interface driver 103 is a program included in the printer driver and it serves to present a setting screen to a user. The user interface driver 103 is also capable of, in response to receiving, in step S905, information indicating the completion of spooling from the GDI 102, prompting a user to again set the information before printing is started.

This function is used in the present embodiment such that when previewing is performed, the user interface driver 103 activates the previewer 108 which is an application serving to perform previewing.

More specifically, as shown in FIG. 3, if the user interface driver 103 receives, from the GDI 102, the information indicating that the spooling has been completed, the user interface driver 103 determines whether the print data specified by the GDI 102 is for previewing (step S301). In this step, the judgment on whether the print data is for previewing is made on the basis of data called DEVMODE in which the UI associated with the print data is described. FIG. 8 shows an example of the data structure of DEVMODE. When the application 101 prompts a user to perform setting associated with the printer driver of a user, the application 101 transmits DEVMODE data to the user interface driver and requests the user interface driver to display the setting screen. When the setting performed by the user is completed, the user interface driver 103 describes the data indicating the setting in DEVMODE and returns it to the application 101. When printing is performed, the application 101 transmits print data together with DEVMODE and requests printing.

In the data structure of DEVMODE, parameters other than dmDriverData indicate specifications which are common with the OS. dmDriverData includes information indicating whether previewing is necessary and dmDriverData is allowed to be used freely by each driver.

In a case in which it is determined in step S301 that previewing is necessary, the user interface driver 103 activates the previewer 108 (step S302). However, if it is determined that previewing is not necessary, the user interface driver 103 terminates the process.

Now, the operation of the print processor 105 is described. As shown in FIG. 10, if the print start request is issued in step S206, the print processor 105 makes a judgment similar to that performed by the user interface driver 103 in step S301. That is, the print processor 105 determines whether the print data specified by the GDI 102 is for previewing (step S1001). If it is determined herein that previewing is not necessary, the present process is ended and the next print process is started.

On the other hand, in a case in which it is determined in step S401 that previewing is necessary, the print processor 105 acquires information indicating the resolution of the preview file 109 from the previewer 108 (step S1002). It is desirable to determine the resolution of the preview file 109 on the basis of the preview size (number of pixels included in one page displayed on the screen). Thus, the previewer 108 calculates the resolution of the preview file 109 on the basis of the current preview size.

Figure 13:
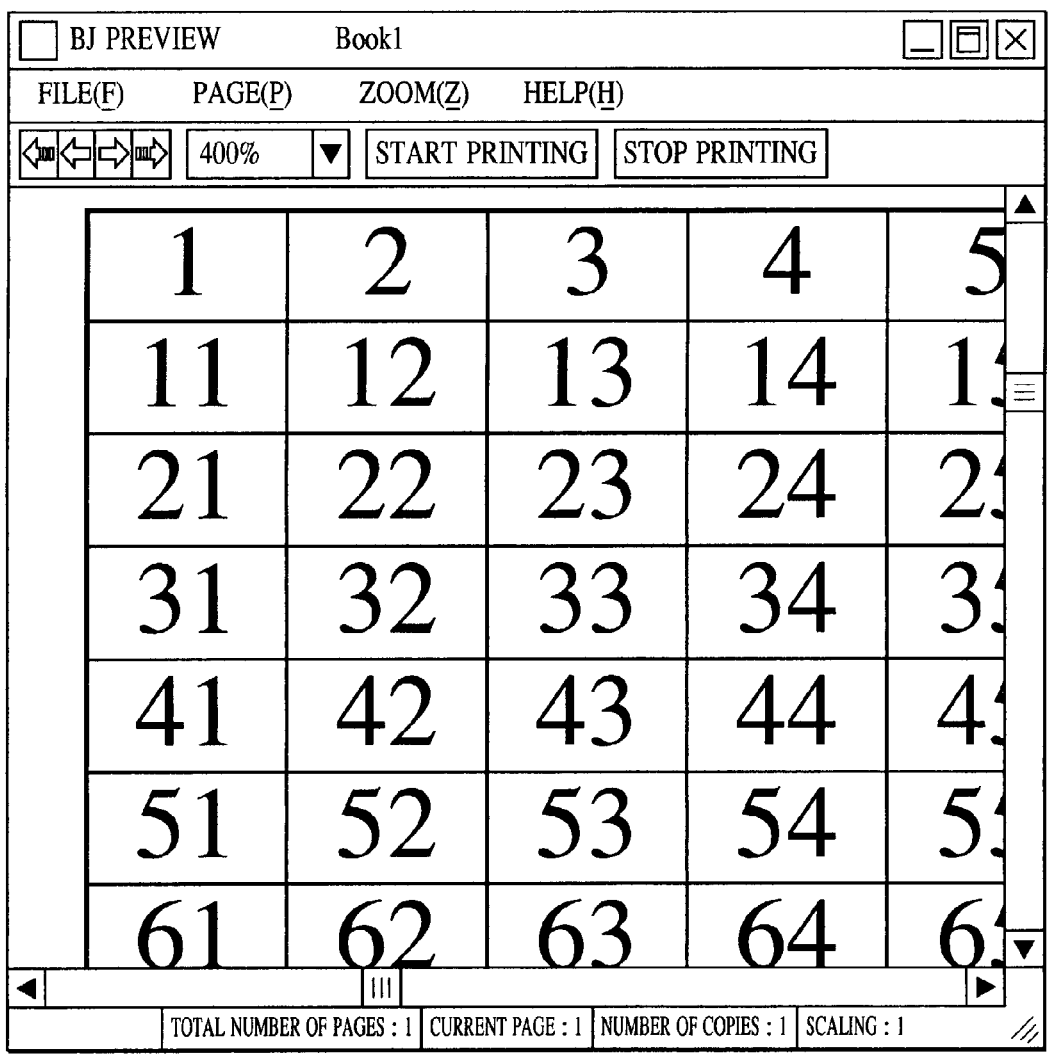
FIG. 13 is a diagram showing an example of a previewed image including border lines with the same width and numerical characters with the same width, rasterized into a resolution different from that of spooled data.

As described earlier, if the resolution of the preview file 109 is set to be low and the scaling factor of the previewed image is too large, jaggies become conspicuous. Conversely, if the resolution of the preview file 109 is too high, it takes a long time to produce the preview file 109. Furthermore, if rasterizing is performed into a resolution different from that of the spooled data, the coordinate transformation is necessary. Besides, in this case, depending on the difference in resolution between the preview file 109 and the spooled data, the width of lines which should be displayed with the same width may differ depending on the location of lines (FIG. 13).

Thus it is necessary to produce the preview file 109 so as to have a resolution which does not cause the problem described above. It is known that lines can be prevented from varying depending on their location by performing rasterizing so that the preview file 109 has a particular resolution. For example, when spooled print data (EMF spool file) has a resolution of 600 dpi, the variation in the line width can be avoided if the resolution of the preview file is set to be equal to 100, 200, or 300 dpi (divisors of the rasterization resolution of the printer). It is also known that jaggies are small enough if the scaling factor is set within the range from 1 to 2. Thus, by setting the resolution so as to satisfy the two conditions described above, it becomes possible to avoid the problems.

In the present embodiment, the previewer 108 has a table in which data indicating resolutions which cause no significant problem for a given printer resolution are described in the order from the lowest degree of problem to the highest degree (for example, when the rasterization resolution of the printer is 600 dpi, optimum resolutions which can avoid the problems are 100, 200, and 300 dpi. As a matter of fact, optimum resolutions vary depending on the resolution of the printer). The previewer 108 converts the resolutions described in the table into the numbers of pixels on the basis of the paper size corresponding to the spooled data and then determines the scaling factors from the numbers of pixels and the preview screen size. Of these resolutions, a resolution which gives a scaling factor (1 to 2) causing no insignificant jaggies is selected as the resolution of the preview file 109.

If the resolution of the preview file 109 is determined in the above-described manner, the same resolution can be employed for slightly-modified images as long as the scaling factor is within the range causing no significant jaggies, and thus the frequency of again producing the preview file 109 can be reduced.

Thereafter, the print processor 105 specifies that initialization for previewing should be performed and also specifies the resolution of the preview file 109. The print processor 105 then requests the GDI 102 to initialize the printer graphic driver 106 and to supply printer information including the printing area and the resolution of the printer 107 (step S1003). In the above process, data specifying that initialization is for previewing and data specifying the resolution of the preview file 109 are described in DEVMODE. More specifically, the resolution of the preview file 109 is described in dmDriverData, as with the preview flag indicating whether the initialization is for previewing. The resolution of the preview file 109 may be specified in dmPrintQuality (printer resolution) indicating specifications which are common with the OS.

The printer graphics driver 106 sets corresponding GDI-INFO depending on whether the initialization is for previewing and returns it to the GDI 102. On the basis of the received data, the GDI 102 returns printer information to the print processor 105 (step S1004). More specifically, as shown in FIG. 6, the printer graphics driver 106 determines whether the initialization is for previewing, on the basis of judgment on whether the preview flag is set (step S501). In this specific example, because the preview flag has been set by the print processor 105, the printer graphics driver 106 calculates printer information corresponding to the resolution for previewing and describes the result in GDIINFO, and the printer graphics driver 106 returns the printer information to the GDI 102 (step S503).

Thereafter, the print processor 105 requests the GDI 102 to perform printing in the area specified in the printer information supplied to the print processor 105 via the GDI 102. Thus, even if the printer graphics driver 106 is in a mode in which the resolution becomes different from the resolution of spooled data, the printing is performed into the same layout regardless of the difference in resolution because, in response to the request from the print processor 105, the GDI 102 performs the coordinate transformation on the EMF spool file 104 and outputs the resultant data to the printer graphics driver 106 on a page-by-page basis (step S1005).

The printer graphics driver 106 rasterizes the print data received from the GDI 102 into a bitmap form and stores the resultant bitmap data as a preview file 109 in the form of an image file (step S1006). If rasterizing of one-page print data is completed, the printer graphics driver 106 temporarily stops the process so that the print processor 105 can perform the subsequent process. The preview file 109 may be in any form. For example, the preview file 109 may be in the form of multilevel data before being halftoned or in the form of two-level data after being halftoned.

After completion of producing the preview file 109, the print processor 105 informs the previewer 108 of the completion of producing the preview file 109 and the print processor 105 requests the previewer 108 to display the preview file 109 (step S1007). The previewer 108 displays, on the display 112, the preview file 109 produced in step S1006 described above (step 1008). In general, the previewer 108 has the capability of displaying a preview image on the display 112 such that the entire page is displayed with a size specified by a user and also has the capability of displaying a specified part in an enlarged fashion. More specifically, as shown in FIG. 12, a preview image can be displayed with a specified scaling factor or a particular part of the displayed preview image can be selected and displayed in an enlarged fashion. Although only fixed preview sizes (%) are allowed in the specific example shown in FIG. 12, the scaling factor may be specified in steps of one percent.

After displaying the preview image, the previewer 108 determines whether a command for changing the preview size has been issued by a user (step S1009). If the preview size change command has been issued, the previewer 108 determines the resolution of the preview file 109 in a similar manner as in step S1002 and further determines whether the determined resolution is different from the resolution of the preview file 109 being currently displayed (step S1010). In a case in which the determined resolution is different from the resolution of the preview file 109 being currently displayed, the process is again performed from step S1002. However, in a case in which the determined resolution is the same as the resolution of the preview file 109 being currently displayed, the process returns to step S1008 to display the preview image using the same preview file 109.

For example, in a case in which the preview size currently specified is 100%, and the resolution obtained in step S1002 is equal to 100 dpi, if the user has issued a command to change the preview size to 101%, the process jumps to step S1010. If it is determined in step S1010 that the calculated resolution is equal to 100 dpi, then the process proceeds to step S1008. When the process proceeds to step S1010 in response to a command for further changing the preview size to 151%, if it is determined in step S1010 that the calculated resolution becomes 200 dpi, the process returns to step S1002.

In the case in which only fixed preview sizes (%) are allowed as shown in FIG. 12, the correspondence between the preview size and the resolution may be described in a table for example such that 100% corresponds to 100 dpi, 200% to 200 dpi, and 400% to 300 dpi (one of selectable preview sizes is related to a resolution which causes no significant problems when data with a high resolution for printing is converted to data with a low resolution for previewing), and in step S1002, a resolution corresponding to a specified preview size (%) may be determined from the table. In this case, decision step S1010 becomes unnecessary. That is, if an answer in step S1009 is YES, the process returns to step S1002.

In a case in which it is determined in step S1009 that changing in the preview size is not requested, it is determined that a print start command has been issued by the user, and the previewer 108 requests the print processor 105 to start printing (step S1011).

In the above-described process according to the present embodiment, the previewer 108 is activated by the user interface driver 103. Alternatively, the previewer 108 may be activated by the printer graphics driver 106 or the print processor 105.

The process of printing the spooled data is described below. This process is performed when a print command is issued by the application or when a print command is issued in the preview process.

To print spooled data, as shown in FIG. 11, the print processor 105 first initializes the printer graphics driver 106 (step S1101). Herein, to initialize the printer graphics driver 106, it is required to inform the printer graphics driver 106 that the initialization is not for previewing but for printing. To this end, the print processor 105 clears the preview initialization flag which has been set in step S1003 and the print processor 105 requests, via the GDI 102, the print graphics driver 106 to perform initialization and supply printer information indicating the printing area and the resolution of the printer.

The printer graphics driver 106 sets corresponding GDI-INFO depending on whether the initialization is for previewing, and the printer graphics driver 106 returns GDIINFO to the GDI 102. On the basis of the received data, the GDI 102 returns printer information to the print processor 105 (step S1102). The judgment on whether the initialization of the printer graphics driver 106 is for previewing is made, as shown in FIG. 6, on the basis of the judgment on whether the preview flag is set (step S501). In this specific case, because the preview flag has been cleared by the print processor 105 in step S501, the printer graphics driver 106 calculates printer information corresponding to the high resolution for printing and describes the result in GDIINFO, and the printer graphics driver 106 returns GDIINFO to the GDI 102 (step S502).

Thereafter, as in step S1005, the print processor 105 requests the GDI 102 to perform printing in the area specified in the printer information supplied to the print processor 105 via the GDI 102 (step S1103). Thus, the printer graphics driver 106 is in a state in which the resolution is the same as that of the spooled data, and thus printing can be performed with the original resolution without needing the coordinate transformation by the GDI 102.

In response to the request, the GDI 102 outputs the EMF spool file 104 to the printer graphics driver 106 (step S1104). The printer graphics driver 106 rasterizes the EMF spool file 104 into a bitmap form (step S1105). The printer graphics driver 106 then converts the rasterized bitmap data into a printer command and outputs it to the printer 107 (step S1106), and the process is completed.

In the present embodiment, as described above, the resolution of the bitmap data for use in previewing is changed depending on the preview size so as to minimize jaggies and location-dependent variations in line width in the preview image which can occur when the preview size is changed. This also makes it possible to minimize the frequency of again producing the preview image in response to changing the preview image size.

Although in the present embodiment, the user interface driver 103 activates the previewer 108 and the print processor requests starting of the previewing operation, the print processor 105 may activate the previewer 108 or the printer graphics driver 106 may activate the previewer 108 and request starting of the previewing operation.

In the embodiment described above, the resolution is calculated from the preview size. However, in a case in which only particular preview sizes are supported, resolutions for all preview sizes may be calculated in advance and the calculated resolutions may be stored in a table.

The above-described functions (including functions described above with reference to the flow charts shown in FIGS. 2 to 6 and 9 to 11) of the present embodiment may also be achieved by supplying a storage medium, on which a software program implementing the functions is stored, to a system or an apparatus whereby a computer (CPU or MPU) in the system or apparatus reads and executes the program code stored on the storage medium.

In this case, it should be understood that the program code read from the storage medium implements the functions of invention and thus the storage medium storing the program code falls within the scope of present invention.

Specific examples of storage media which can be preferably employed in the present invention to supply the program code include a floppy disk (registered trademark), a hard disk, an optical disk, a magneto-optical disk, a CD-ROM, a CD-R, a magnetic tape, a nonvolatile memory card, and a ROM.

Furthermore, the scope of the present invention includes not only such a system in which the functions of any embodiment described above is implemented simply by reading and executing a program code on a computer but also a system in which a part of or the whole of process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of the process instructed by the program code is performed by a CPU or the like in the function extension board or the function extension unit thereby implementing the functions of any embodiment described above.

In the present embodiment, as described above, print data produced by the application is converted into preview image data depending on the preview resolution, and the resultant preview image data is stored in storage means. A preview image obtained from the preview image data stored in the storage means is displayed on the display means. If a command for changing the size of the preview image being displayed is issued by a user, the preview resolution corresponding to the specified new preview size is calculated. Thereafter, it is determined whether the resolution of the preview image data stored in the storage means should be changed depending on the calculated preview resolution. If the change in the resolution of the preview image data is not necessary, the preview image obtained from the preview image data stored in the storage means is displayed on the display means such that the displayed image has the specified new preview size. In the case in which a change in the resolution of the preview image data is necessary, the print data is converted into preview image data corresponding to the determined preview resolution and the resultant preview image data is stored into the storage means. The preview image obtained from the preview image data stored in the storage means is displayed on the display means such that the displayed image has the specified preview size. This makes it possible to minimize jaggies and location-dependent variations in line width in the preview image which can occur when the preview size is changed and also makes it possible to minimize the frequency of again producing the preview image in response to changing the preview image size.

Furthermore, according to the present embodiment, it is possible to provide a printer driver capable of previewing without creating significant jaggies and variations in line width.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   a memory and at least one processor;
   an application;
   a graphics device interface;
   a driver;
   a print processor; and
   a previewer,
   wherein the application requests the graphics device interface to initialize the driver and to return a resolution,
   wherein the graphics device interface in response to the requested initialization of the driver initializes the driver and requests the driver for printer information,
   wherein the driver in response to the request for printer information returns the printer information depending on a print resolution to the application in a case where a flag indicating initialization for previewing is not set, wherein the application in response to the returned printer information depending on the print resolution creates print data based on the printer information depending on the print resolution and outputs the created print data to the graphics device interface, the graphics device interface in response to the created print data spools the print data according to a standard spool file format and requests the print processor to start printing, wherein the print processor in response to the request to start printing, when previewing is necessary, sets the flag indicating initialization for previewing and requests the graphics device interface to initialize the driver and request the resolution, wherein the graphics device interface in response to the initialization request initializes the driver and requests the printer information to the driver, wherein the driver in response to the request for the printer information returns the printer information depending on a preview resolution to the print processor when the flag indicating initialization for previewing is set, the print processor in response to the printer information depending on the preview resolution requests the graphics device interface to output print data based on the printer information depending on the preview resolution, wherein the graphics device interface in response to the request to output the print data based on the printer information depending on the preview resolution performs coordinate transformation based on the printer information depending on the preview resolution on the print data created and spooled based on the printer information of the print resolution, and outputs the transformed print data to the driver, wherein the driver in response to the output transformed print data rasterizes the transformed print data and stores the rasterized print data into a preview file, and wherein the previewer previews the print data in the preview file.

2. An information processing apparatus comprising:

a memory and at least one processor;
a driver;
a print processor; and
a previewer, wherein an application requests a graphics device interface to initialize the driver and return a resolution, wherein the graphics device interface in response to the request to initialize the driver initializes the driver and requests printer information of the driver, wherein the driver in response to the request for printer information returns the printer information depending on a print resolution to the application when a flag indicating initialization for previewing is not set, wherein the application in response to the return of the print information depending on the print resolution creates print data based on the print resolution and outputs the created print data to the graphics device interface, wherein the graphics device interface in response to the output print data spools the print data according to a standard spool file format and requests the print processor to start printing, wherein the print processor in response to the request to start the printing, when previewing is necessary, sets the flag indicating initialization for previewing and requests the graphics device interface to initialize the driver and return the resolution, wherein the graphics device interface in response to the request to initialize the driver initializes the driver and requests printer information of the driver, wherein the driver in response to the request for the printer information returns the printer information depending on a preview resolution to the print processor when the flag indicating initialization for previewing is set, wherein the print processor in response to the print information depending on the preview resolution requests the graphics device interface to output print data based on the printer information depending on the preview resolution, wherein the graphics device interface in response to the request to output the print data based on the printer information depending on the preview resolution performs coordinate transformation based on the printer information depending on the preview resolution on the print data created and spooled based on the printer information of the print resolution, and outputs the transformed print data to the driver, wherein the driver in response to the output transformed print data rasterizes the transformed print data and stores the rasterized print data into a preview file, and wherein the previewer previews the print data in the preview file.

3. The information processing apparatus according to claim 2, wherein the previewer decides resolution of the preview file when a preview size is changed, and determines whether or not the decided resolution and resolution of the preview file currently previewed are different, wherein the print processor acquires the decided resolution of the preview file from the previewer when the decided resolution and the resolution of the preview file currently previewed are detected to be different, and designates the preview resolution, wherein the print processor in response to acquiring the resolution of the preview file initializes the driver via the graphics device interface, and requests the driver the printer information, wherein the driver in response to the request of the print information returns the printer information depending on the preview resolution to the print processor when the flag indicating initialization for previewing is set, wherein the print processor in response to the printer information depending on the preview resolution requests the graphics device interface to output the print data based on the printer information depending on the preview resolution, wherein the graphics device interface in response to the output print data based on the printer information depending on the preview resolution performs the coordinate transformation based on the printer information depending on the preview resolution on the print data created and spooled based on the printer information depending on the print resolution and outputs the transformed print data to the driver, wherein the driver in response to the output transformed print data rasterizes the transformed print data and stores the rasterized print data into the preview file, and wherein the previewer previews the print data in the preview file.

4. A non-transitory computer-readable storage medium storing a program module, the program module comprising:
a driver;
a print processor; and
a previewer,
wherein an application requests a graphics device interface to initialize the driver and to return a resolution,
wherein the graphics device interface in response to the request to initialize the driver initializes the driver and requests printer information of the driver,
wherein the driver in response to the request for printer information returns the printer information depending on a print resolution to the application when a flag indicating initialization for previewing is not set,
wherein the application in response to the return of the print information depending on the print resolution creates print data based on the print resolution and outputs the created print data to the graphics device interface,
wherein the graphics device interface in response to the output print data spools the print data according to a standard spool file format and requests the print processor to start printing,
wherein the print processor in response to the request to start the printing, when previewing is necessary, sets the flag indicating initialization for previewing and requests the graphics device interface to initialize the driver and return the resolution,
wherein the graphics device interface in response to the request to initialize the driver initializes the driver and requests printer information of the driver,
wherein the driver in response to the request for the printer information returns the printer information depending on a preview resolution to the print processor when the flag indicating initialization for previewing is set,
wherein the print processor in response to the print information depending on the preview resolution requests the graphics device interface to output print data based on the printer information depending on the preview resolution,
wherein the graphics device interface in response to the request to output the print data based on the printer information depending on the preview resolution performs coordinate transformation based on the printer information depending on the preview resolution on the print data created and spooled based on the printer information of the print resolution, and outputs the transformed print data to the driver,
wherein the driver in response to the output transformed print data rasterizes the transformed print data and stores the rasterized print data into a preview file, and
wherein the previewer previews the print data in the preview file.

5. The non-transitory computer-readable storage medium according to claim 4,
wherein the previewer decides resolution of the preview file when a preview size is changed, and determines whether or not the decided resolution and resolution of the preview file currently previewed are different,
wherein the print processor acquires the decided resolution of the preview file from the previewer when the decided resolution and the resolution of the preview file currently previewed are detected to be different, and designates the preview resolution,
wherein the print processor in response to acquiring the resolution of the preview file initializes the driver via the graphics device interface, and requests the driver the printer information,
wherein the driver in response to the request of the print information returns the printer information depending on the preview resolution to the print processor when the flag indicating initialization for previewing is set,
wherein the print processor in response to the printer information depending on the preview resolution requests the graphics device interface to output the print data based on the printer information depending on the preview resolution,
wherein the graphics device interface in response to the output print data based on the printer information depending on the preview resolution performs the coordinate transformation based on the printer information depending on the preview resolution on the print data created and spooled based on the printer information depending on the print resolution and outputs the transformed print data to the driver,
wherein the driver in response to the output transformed print data rasterizes the transformed print data and stores the rasterized print data into the preview file, and
wherein the previewer previews the print data in the preview file.

6. A non-transitory computer-readable storage medium storing a program module, the program module comprising:
a driver;
a print processor; and
a previewer,
wherein a graphics device interface in response to input of print data spools the print data according to a standard spool file format and requests the print processor to start printing,
wherein the print processor in response to the request to start the printing, when previewing is necessary, sets a flag indicating initialization for previewing and requests the graphics device interface to initialize the driver and to return a resolution,
wherein the graphics device interface in response to the request to initialize the driver initializes the driver and requests printer information to the driver,
wherein the driver in response to the request for the printer information returns the printer information depending on a preview resolution to the print processor when the flag indicating initialization for previewing is set,
wherein the print processor in response to the print information depending on the preview resolution requests the graphics device interface to output print data based on the printer information depending on the preview resolution,
wherein the graphics device interface in response to the request to output the print data based on the printer information depending on the preview resolution performs coordinate transformation based on the printer information depending on the preview resolution on the print data created and spooled based on the printer information of the print resolution, and outputs the transformed print data to the driver,
wherein the driver in response to the output transformed print data rasterizes the transformed print data and stores the rasterized print data into a preview file, and
wherein the previewer previews the print data in the preview file.

7. A preview method executed by an information processing apparatus comprising:
a processor of the information processing apparatus performing the steps of:
requesting a graphics device interface from an application to initialize a driver and to return a resolution;

initializing the driver and requesting printer information of the driver in response to the request to the graphics device interface to initialize the driver;

returning the printer information depending on a print resolution to the application, in response to the request to the driver for the printer information, when a flag indicating initialization for preview is not set;

creating print data based on the printer information depending on the print resolution and outputs the created print data to the graphics device interface in response to the return of the printer information to the application;

spooling the print data according to a standard spool file format and requesting a print processor to start printing in response to the output print data to the graphics device interface;

setting the flag indicating initialization for previewing when previewing is necessary and requesting the graphics device interface to initialize the driver and to return the resolution in response to the request to the print processor to start the printing;

initializing the driver and requesting for the printer information in response to the request to the graphics device interface to initialize the driver;

returning the printer information depending on a preview resolution to the print processor when the flag indicating initialization for previewing is set, in response to the request to the driver for the printer information;

requesting the graphics device interface to output print data based on the print information depending on the preview resolution in response to the return of the printer information depending on the preview resolution to the print processor;

performing coordinate transformation based on the printer information depending on the preview resolution on the print data created and spooled based on the printer information depending on the print resolution and outputting the transformed print data to the driver, in response to the request to the graphics device interface to output the print data based on the printer information depending on the preview resolution;

rasterizing the transformed print data and storing the rasterized print data into a preview file in response to the output transformed print data to the driver; and previewing the print data in the preview file by a previewer.

8. The preview method according to claim 7, wherein the previewer decides resolution of the preview file when a preview size is changed, and determines whether or not the decided resolution and resolution of the preview file currently previewed are different, wherein the print processor acquires the decided resolution of the preview file from the previewer when the decided resolution and the resolution of the preview file currently previewed are detected to be different, and designates the preview resolution, wherein the print processor in response to acquiring the resolution of the preview file initializes the driver via the graphics device interface, and requests the driver the printer information, wherein the driver in response to the request of the print information returns the printer information depending on the preview resolution to the print processor when the flag indicating initialization for previewing is set, wherein the print processor in response to the printer information depending on the preview resolution requests the graphics device interface to output the print data based on the printer information depending on the preview resolution, wherein the graphics device interface in response to the output print data based on the printer information depending on the preview resolution performs the coordinate transformation based on the printer information depending on the preview resolution on the print data created and spooled based on the printer information depending on the print resolution and outputs the transformed print data to the driver, wherein the driver in response to the output transformed print data rasterizes the transformed print data and stores the rasterized print data into the preview file, and wherein the previewer previews the print data in the preview file.

9. A preview method executed by an information processing apparatus comprising:

a processor of the information processing apparatus performing the steps of:

spooling print data according to a standard spool file format and requesting a print processor to start printing in response to output of the print data to a graphics device interface;

setting a flag indicating initialization for previewing when previewing is necessary and requesting the graphics device interface to initialize a driver and to return a resolution in response to the request to the print processor to start the printing;

initializing the driver and requesting for printer information in response to the request to the graphics device interface to initialize the driver;

returning the printer information depending on a preview resolution to the print processor when the flag indicating initialization for previewing is set, in response to the request to the driver for the printer information;

requesting the graphics device interface to output print data based on the print information depending on the preview resolution in response to the return of the printer information depending on the preview resolution to the print processor;

performing coordinate transformation based on the printer information depending on the preview resolution on the print data created and spooled based on the printer information depending on the print resolution and outputting the transformed print data to the driver, in response to the request to the graphics device interface to output the print data based on the printer information depending on the preview resolution;

rasterizing the transformed print data and storing the rasterized print data into a preview file in response to the output transformed print data to the driver; and previewing the print data in the preview file by a previewer.

* * * * *